UNITED STATES PATENT OFFICE.

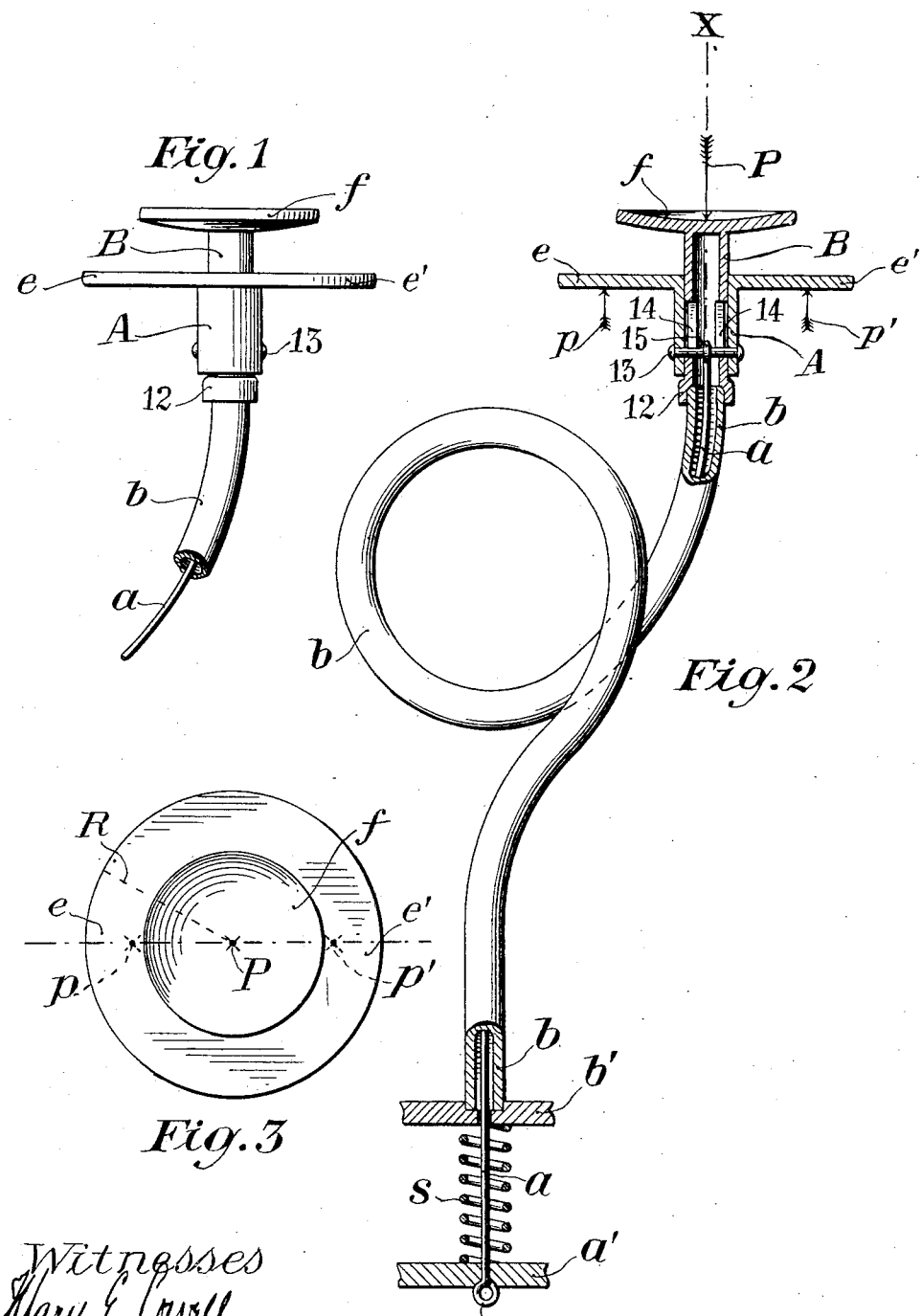

JOSEPH BECKER, OF WASHINGTON, DISTRICT OF COLUMBIA, ASSIGNOR TO EASTMAN KODAK COMPANY, OF NEW YORK, N. Y., A CORPORATION OF NEW YORK.

CAMERA-SHUTTER-OPERATING MECHANISM.

975,601.              Specification of Letters Patent.     Patented Nov. 15, 1910.

Original application filed June 26, 1901, Serial No. 66,159. Divided and this application filed November 16, 1907. Serial No. 402,518.

*To all whom it may concern:*

Be it known that I, JOSEPH BECKER, a citizen of the United States, residing at Washington, in the District of Columbia, have invented a new and useful Camera-Shutter-Operating Mechanism, of which the following is a specification.

The present application for patent is drawn to a separably patentable part of my prior application for camera shutter operating mechanisms, filed June 26, 1901, Serial No. 66,159.

The invention consists in an improved form of that part of the shutter operating mechanism that is referred to in the said prior application as the "sender." The "sender" is the means used to apply the push and equal pull which are to be carried through the flexible transmission to the shutter or other part to be actuated; and the present invention consists in means permitting the operator to apply the push and equal pull in the direction parallel to the tangentially produced axis of the flexible transmission and symmetrically with respect to such tangentially produced axis, so that the action shall be as direct as possible and free from tendencies to produce binding.

The invention further consists in constructing the surfaces to be acted on as surfaces of revolution about such tangentially produced axis of the flexible transmission, so that the operator may seize and act on the said surfaces in any angular relation to a given radial line thereof.

The invention further consists in details of construction.

The invention is independent of the specific form of flexible transmission used, and is also independent of the exact mode of operation at the shutter or receiving end, so that it may be used in combination with the type of flexible transmission shown in U. S. Patent to Stoddard, No. 231,506 of August 24, 1880 (in which the lighter parts are actuated by the tension element of the flexible transmission), as well as in combination with the type of sender shown, described and claimed in my said prior application (in which the same lighter parts are actuated by the compression element of the flexible transmission).

A preferred form of my sender is shown in the annexed drawing in which:

Figure 1 is a side view of the sender with the adjacent part of the flexible transmission. Fig. 2 is a section of the same on the plane $p$ $p'$ of Fig. 3, showing the flexible transmission in full and the parts on which the flexible transmission is intended to act, in section. Fig. 3 is a plan of the sender.

The flexible transmission comprises a wire or other tension element $a$, and a tubular compression element $b$. These parts $a$ and $b$ may be of any preferred construction, but they should both be flexible and the tension element $a$ should be practically inextensible while the compression element $b$ should be longitudinally incompressible. At the "receiving end" of this flexible transmission the tension element $a$ passes freely through a part $b'$ and has its end 10 fixed in any preferred manner to a part $a'$. Parts $a'$ and $b'$ are normally held apart by any suitable means, such as a spring $s$, and the flexible transmission is to be used to force parts $a'$ and $b'$ together against the separating action of this spring. The tension element $a$ acts by pulling on part $a'$ and the compression element $b$ acts by pushing against part $b'$. The push on $b'$ and the equal pull on $a'$ are transmitted from the "sending end" of the flexible transmission where they are produced by means of the "sender."

The sender in its present preferred form comprises a short outer tube A to act as "puller" and a longer inner tube B to act as "pusher." The inner tube B projects through both ends of the outer tube A and is enlarged at 12 to admit, hold and bear against the end of the outer or compression element $b$ of the transmission. At its opposite end tube B has a head $f$ against which pressure is preferably applied at the central point as indicated by arrow P, and as this pressure is usually applied with the thumb the head is formed to fit the thumb.

The shorter external tube or puller A is connected to the inner tension element $a$ of the transmission by a transverse pin 13 which is firmly riveted to A and passes freely through two opposite longitudinal slots 14 formed in tube B, and through an eye 15 formed at the end of the tension element $a$. The tube A has lateral extensions $e$ $e'$ adapted to receive pressure in the manner and at the two places indicated by arrows $p$ and $p'$, Figs. 2 and 3. When the thumb is used to produce the pressure P the index and middle fingers are used to produce pressures $p$ and $p'$. Pressures $p$ $p'$ are thus applied at points situated symmetrically on opposite sides of the tangentially produced axis X of the flexible transmission $a$ $b$ so that their resultant lies substantially coincident with said axis and acts as a direct pull on the tension element $a$. Pressure P equal to the sum of $p$ and $p'$ is applied along axis X in direct opposition to the resultant pull so that all the resultant efforts are axial and have no tendency to produce binding as would be the case if all pressures were applied to one side of axis X, although the device is still operative if the pressures are so applied.

The head $f$ and the extensions $e$ $e'$ are preferably formed in the shape of surfaces of revolution about X as axis so that the plane of the pressures P, $p$, $p'$, as seen in the plan view, Fig. 3, may occupy any angular relation to a given radial line R drawn in the sender. The advantage of this feature is that the operator does not have to turn the sender into any certain position to actuate it. He simply catches hold of the sender in the most convenient manner and applies pressure to release the shutter if it be of the common type, or to prime and then release it if it be of the so-called automatic type. The device is, of course, well adapted to produce all effects heretofore produced with a bulb, and is particularly useful in producing so-called "bulb exposures" and "time exposures," which a bulb often misses because of leakage.

As stated in the preamble the present invention is independent of the specific form of the flexible transmission provided only the same shall include a longitudinally inextensible pull element bound throughout its length closely with a longitudinally incompressible push element; the latter being preferably so made as to serve also as the binding means, and so the axis of the pull element shall coincide throughout with the axis of the push element, whatever may be the amount of flexure.

What I claim as my invention and desire to secure by Letters Patent is:

1. The combination with a flexible means for positively transmitting motion having a flexible but longitudinally inextensible tension element closely bound throughout its length with a flexible but longitudinally incompressible compression element; of a sender at one end of such transmission for simultaneously exerting a direct pull on the end of said tension element and a substantially equal and directly opposed push against the end of said compression element, said sender comprising a pusher for exerting a pushing effort along the tangentially produced axis of the said flexible transmission and a puller for exerting pulling efforts at points situated on opposite sides of the said pusher.

2. The combination with a flexible means for positively transmitting motion having a flexible but longitudinally inextensible tension element closely bound throughout its length with a flexible but longitudinally incompressible compression element; of a sender at one end of such transmission for simultaneously exerting a direct pull on the end of said tension element and a substantially equal and directly opposed push against the end of said compression element, said sender comprising a pusher for exerting a pushing effort along the tangentially produced axis of the said flexible transmission and a puller for exerting pulling efforts at points situated on opposite sides of the said pusher, the surface of application of the said pulling efforts being formed as an annular surface of revolution about the same said axis.

3. The combination with a flexible means for positively transmitting motion having a flexible but longitudinally inextensible tension element closely bound throughout its length with a flexible but longitudinally incompressible compression element; of a sender at one end of such transmission for simultaneously exerting a direct pull on the end of said tension element and a substantially equal and directly opposed push against the end of said compression element, said sender comprising a pusher for exerting a pushing effort along the tangentially produced axis of the said flexible transmission and a puller for exerting pulling efforts at points situated on opposite sides of the said pusher, the surfaces of application of the said pushing and pulling efforts being formed as surfaces of revolution about the same said axis.

4. The combination with a flexible means for positively transmitting motion having a transversely flexible but longitudinally inextensible tension element and a transversely flexible but longitudinally incompressible tubular compression element, said tension element passing longitudinally through the said compression element; of a sender at one end of such transmission for simultaneously exerting a direct pull on the end of said tension element and a substantially equal and directly opposed push against the end of said compression element, said sender comprising two conaxial telescoping parts, the outer telescoping part being connected with the said internal tension element as puller, and the inner telescoping part being adapted to bear against the said external compression element as pusher.

5. The combination with a flexible means for positively transmitting motion having a transversely flexible but longitudinally inextensible tension element and a transversely flexible but longitudinally incompressible tubular compression element, said tension element passing longitudinally through the said compression element; of a sender at one end of such transmission for simultaneously exerting a direct pull on the end of said tension element and a substantially equal and directly opposed push against the end of said compression element, said sender comprising two conaxial telescoping parts, the outer telescoping part being connected with the said internal tension element as puller, and the inner telescoping part being adapted to bear against the said external compression element as pusher, the said puller being shorter than the said pusher and provided with a circular outwardly projecting flange to serve as pulling surface.

6. The combination with a flexible means for positively transmitting motion having a transversely flexible but longitudinally inextensible tension element and a transversely flexible but longitudinally incompressible tubular compression element, said tension element passing longitudinally through the said compression element; of a sender at one end of such transmission for simultaneously exerting a direct pull on the end of said tension element and a substantially equal and directly opposed push against the end of said compression element, said sender comprising two conaxial telescoping parts, the outer telescoping part being connected with the said internal tension element as puller, and the inner telescoping part being adapted to bear against the said external compression element as pusher, the said puller being provided with a transverse pin fastened thereto and the said pusher having openings formed therein to freely admit said pin and permit it to move longitudinally of the tubular part of said pusher, said pin being fastened to the end of the said tension element at a point inside of the said pusher.

7. The combination with a flexible means for positively transmitting motion having a transversely flexible but longitudinally inextensible tension element and a transversely flexible but longitudinally incompressible tubular compression element, said tension element passing longitudinally through the said compression element of a pusher for exerting a pushing effort along the tangentially produced axis of the said flexible transmission and a puller adapted to be acted on, on opposite sides of said axis for exerting a resultant pulling effort along the said axis.

In testimony whereof, I have signed this specification in the presence of two subscribing witnesses.

JOSEPH BECKER.

Witnesses:
MARY E. CORVELL,
EDMUND H. BECKER.